United States Patent [19]

Cullmann et al.

[11] Patent Number: 4,706,916
[45] Date of Patent: Nov. 17, 1987

[54] SUPPORT STAND WITH ADJUSTABLE LEGS

[75] Inventors: Wolfgang Cullmann, Langenzenn; Klaus Leinfelder, Oberasbach, both of Fed. Rep. of Germany

[73] Assignee: Cullmann Handelsgesellschaft für Verbrauchsgüter mbH, Langenzenn-Laubendorf, Fed. Rep. of Germany

[21] Appl. No.: 782,425

[22] Filed: Sep. 30, 1985

[51] Int. Cl.⁴ ............................................. F16M 13/00
[52] U.S. Cl. ................... 248/168; 248/412; 248/188.5; 248/407; 74/107
[58] Field of Search ............... 248/168, 188.5, 337, 248/412, 163.1, 407; 74/104, 107; 403/59, 61, 116; 354/293; D16/45

[56] References Cited

U.S. PATENT DOCUMENTS

| | | | |
|---|---|---|---|
| 2,587,511 | 2/1952 | Nerman | 248/168 |
| 2,591,051 | 3/1952 | Caldwell | 248/168 |
| 2,694,542 | 11/1954 | Barbakoff | 248/168 |
| 2,703,691 | 3/1955 | Minnis | 248/188.5 |
| 2,849,249 | 8/1958 | Fridolph | 248/412 |
| 3,390,921 | 7/1968 | Klimek | 74/107 |
| 3,697,103 | 10/1972 | Mostyn | 248/407 |
| 3,727,872 | 4/1973 | Spieth et al. | 248/412 |
| 3,885,449 | 5/1975 | Green | 74/107 |
| 3,941,492 | 3/1976 | Meinunger | 248/188.5 |
| 4,029,279 | 0/1977 | Nakatami | 248/188.5 |
| 4,113,222 | 9/1978 | Frinzel | 248/412 |
| 4,185,936 | 1/1980 | Takahashi | 248/188.5 |
| 4,360,283 | 11/1982 | Psotta | 248/412 |
| 4,387,478 | 6/1983 | Smith | 403/61 |
| 4,453,686 | 6/1984 | Ina | 248/168 |

FOREIGN PATENT DOCUMENTS

| | | | |
|---|---|---|---|
| 262549 | 6/1968 | Austria | 248/412 |
| 3430738 | 3/1986 | Fed. Rep. of Germany | 248/412 |
| 3430737 | 9/1986 | Fed. Rep. of Germany | |
| 656640 | 5/1929 | France | 248/412 |
| 74932 | 1/1961 | France | 248/412 |

Primary Examiner—Cornelius J. Husar
Assistant Examiner—Eric K. Nicholson

[57] ABSTRACT

A support stand for a camera or other optical device comprises a head portion supported by support legs comprising first and second telescopically related tube portions, the inner tube portion forming the upper part of the respective leg and the outer tube portion forming the lower part. A fixing device for locking the tube portions of each leg relative to each other comprises an actuating member, a connecting rod and a clamping arrangement connected to the actuating member by the connecting rod and comprising at least one clamping cone member and at least one pressure element. The actuating member is carried on the inner tube portion in the vicinity of the support head portion of the stand. Actuation of the actuating member causes the pressure element to be expanded by displacement of the cone member until the pressure element bears against the inside surface of the outer tube portion, thereby to secure it in position relative to the inner tube portion.

5 Claims, 3 Drawing Figures

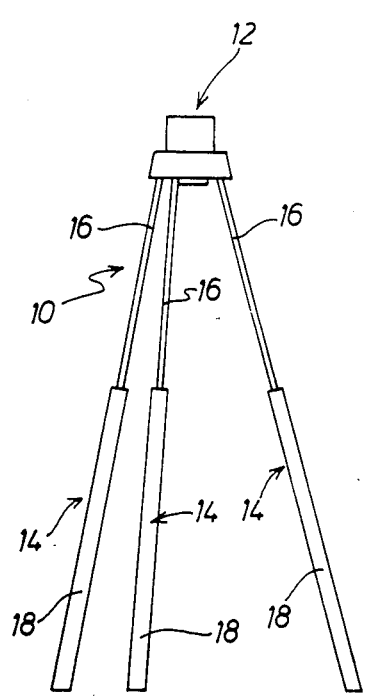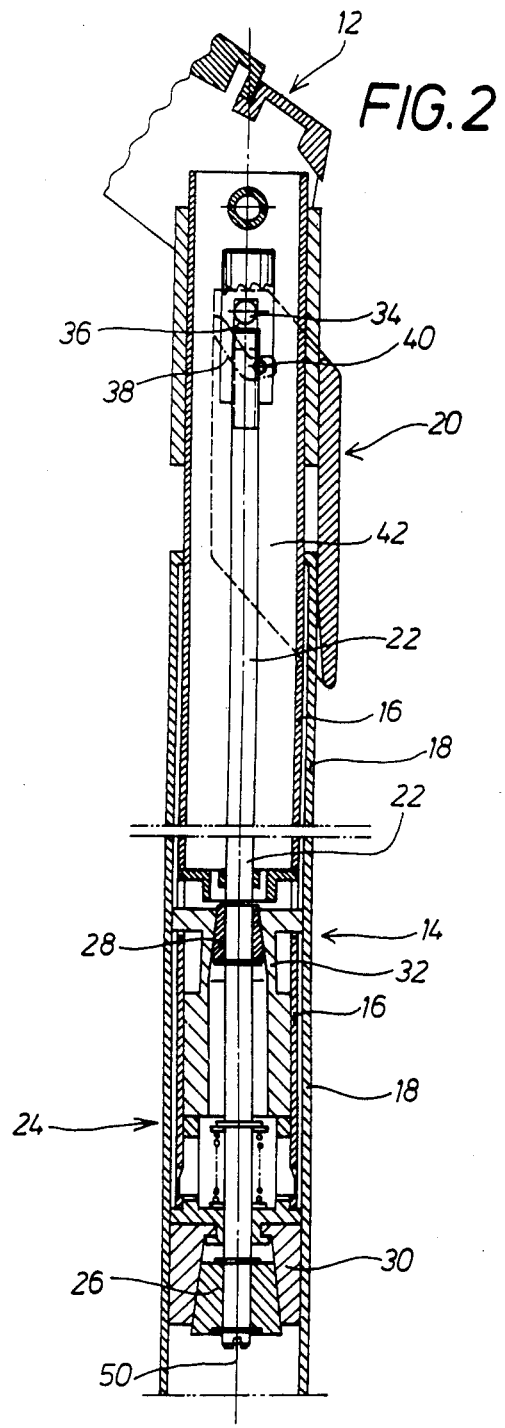

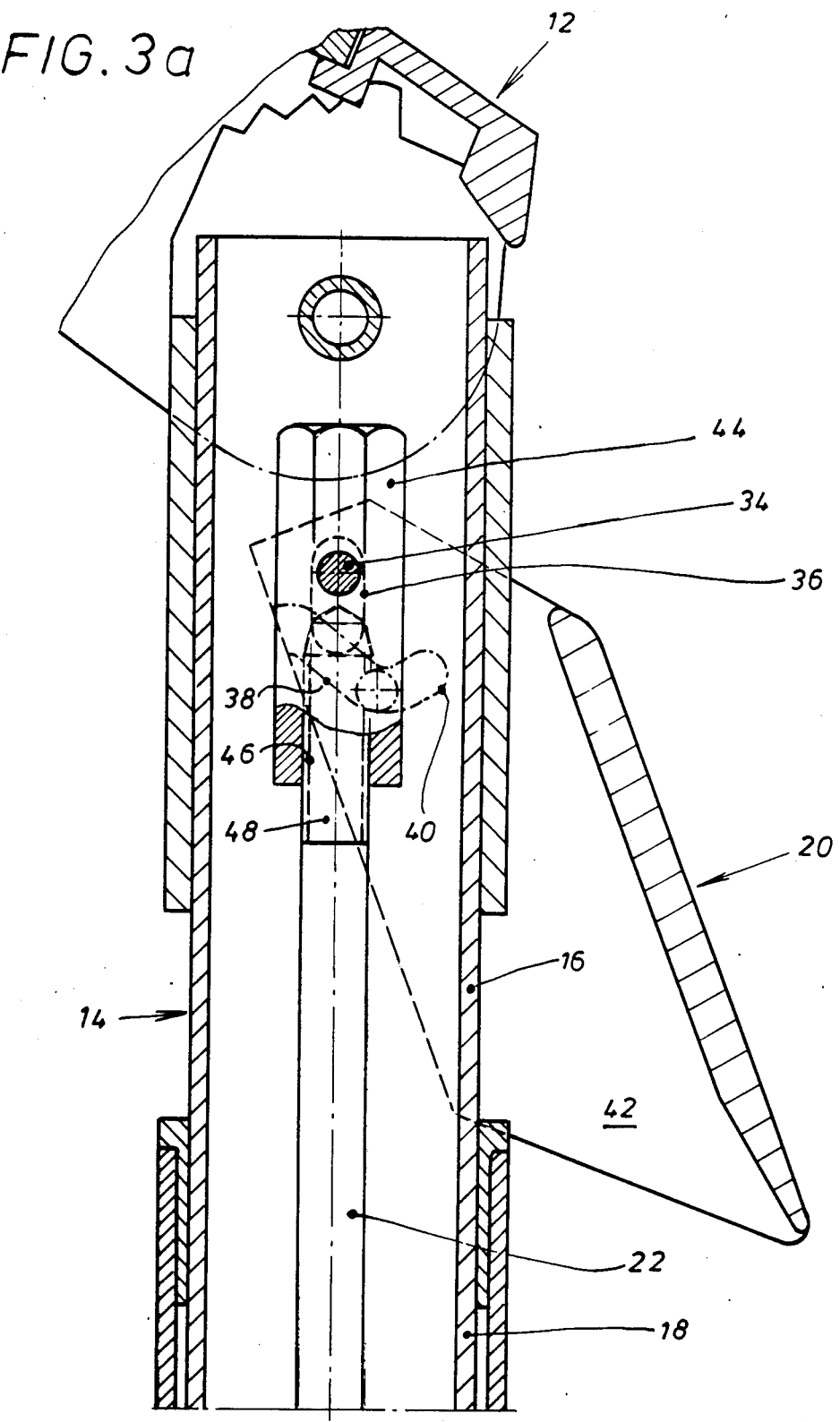

SUPPORT STAND WITH ADJUSTABLE LEGS

BACKGROUND OF THE INVENTION

This application is related to co-pending co-assigned application, Ser. No. 782,426, filed Sept. 30, 1985, and the disclosure of said co-pending application is incorporated herein by reference.

The present invention relates generally to a support stand or tripod for an item of equipment, for example optical equipment such as a photographic, film or video camera or the like.

A known form of such a support stand comprises a head portion on which a device to be supported on the stand is mounted, with support legs extending downwardly away from the head portion. Each support leg comprises first and second tube portions in telescopic relationship, with the outer tube portion, that is to say, the tube portion of larger internal cross-section, being secured to the support head portion while the inner tube portion is disposed partly within the outer tube portion and extends therefrom at the lower end thereof. In other words, the outer tube portion constitutes the upper part of a leg and the inner tube portion constitutes the lower part. The support stand further comprises a fixing device for securing the two tube portions of each leg in a given position relative to each other, with the fixing device for each leg being disposed at or closely adjacent to the lower end of the outer tube portion. That means that it is at a distance from the support head portion, that almost corresponds to the length of the outer tube portion.

Arranging the fixing devices for the respective legs in that way gives rise to a number of disadvantages and difficulties. One of those is that, for actuating a fixing device, it is always necessary for the operator of the item of equipment supported on the stand to bend down from a relatively normal posture of using the equipment, for example for viewing through the viewfinder of a camera, to reach the fixing device which is disposed at a very much lower level. Now, in that situation the operator can generally only bend down to actuate the fixing device to fix a respective leg at a selected length, by ceasing to use the item of equipment, for example by taking his eye away from the viewfinder of the camera which is mounted on the head portion of the support stand, or by taking his eye away from some other item of optical equipment which is similarly mounted thereon, with the result that obviously he can no longer view the scene of which he wished to take a photograph. In other words, having selected a given scene or object to be photographed, in order to adjust the support stand to the height that is most appropriate to that scene or object, the operator is then required to cease viewing the scene or object while setting the height of the stand. That therefore means that he is often required to repeat the process of viewing the scene or object and making an adjustment to the height of the support stand, before he arrives at the correct setting for his purposes.

Another disadvantage of the above-indicated support stand construction is that, when the inner tube portion of each leg is entirely retracted into the outer tube portion, the fixing device on the leg is very close to the ground or other support surface on which the stand is supported, so that when such a stand is used for outside work, for example for working in a field or under like conditions, it is often almost impossible to avoid the fixing devices on the respective legs becoming fouled with dirt and the like. However, fouled fixing devices can give rise to difficulties and failures in operation of the support stand as well as resulting in dirty hands, which is generally undesirable bearing in mind that the operator may be using delicate optical equipment.

SUMMARY OF THE INVENTION

An object of the present invention is to provide a support stand or tripod for an item of equipment such as a camera, which does not suffer from the above-indicated disadvantages.

Another object of the present invention is to provide a support stand for an item of optical equipment which has a fixing device for setting the height of the support head, that does not require the operator to bend down to a substantial degree to lock the support legs of the stand at the selected height.

Yet another object of the invention is to provide a camera support stand which is so designed as to minimise the danger of fouling of the height adjusting and locking mechanism of the stand.

Still another object of the present invention is to provide a camera or like device support stand having a means for locking the stand at a selected height, which permits substantially stepless variation in the set height.

In accordance with the principles of the present invention, these and other objects are achieved by a support stand for an item of equipment, for example an optical device such as a photographic, film or video camera or telescope or the like, comprising a head portion for mounting the item of equipment thereon and support legs connected to the head portion and extending downwardly therefrom in the operative position of the support stand. Each support leg comprises first and second tube portions which are in telescopic relationship with each other, while the stand further includes a fixing device for each leg, whereby the tube portions of that leg can be secured relative to each other. The inner one of the two telescopically related tube portions is connected by way of a first end thereof to the head portion of the support stand, thereby constituting the upper part of the respective leg, while the outer tube portion forms the lower part of the respective leg, by being carried on the inner tube portion, over a part thereof at the second end of the inner tube portion. The fixing device comprises an actuating member such as a lever-type handle, which is disposed on the inner telescopically related tube portion, in the vicinity of the head portion of the support stand. Operatively connected to the actuating member is a connecting member such as a connecting rod, which extends through the inner tube portion to a position beyond the lower end thereof, that is to say, the second end that is remote from the head portion of the support stand. The fixing device further includes a clamping arrangement comprising at least one clamping cone or tapering member carried on the connecting rod and substantially immovable thereon in the axial direction thereof, and, carried by the inner tube portion, at least one pressure element which co-operates with the cone member and is adapted to be expanded thereby, thereby to lock against the inside wall surface of the outer tube portion which is disposed around the pressure element.

By virtue of the fact that the inner one of the two telescopically related tube portions is connected to the head portion of the support stand, while the outer one of the two tube portions, the internal cross-sectional configuration of which is matched to the external cross-sectional configuration of the inner tube portion, is disposed at the lower end of the inner tube portion and thus forms the lower part of the respective support leg, it is readily possible for the actuating member of the leg fixing device to be disposed on the inner tube portion in the vicinity of the head portion of the support stand. That means however that the actuating member is always in the vicinity of the head portion of the support stand, at all times and therefore irrespective of the total set length of the respective leg of the support stand, so that the actuating member can be actuated very easily and without any problem, without the operator having to take his eyes away from a camera or for example another item of optical equipment, which is mounted on the head portion of the support stand, because, as indicated, the actuating member for adjusting the length of each leg is advantageously disposed directly adjacent the head portion of the stand and thus in the direct vicinity of the camera or other item of equipment carried on the stand.

In the construction of the support stand according to the present invention, the connecting rod or like member which is operativly connected to the actuating member of the fixing device extends inside the respective leg over a length which corresponds to the length of the inner tube portion of the two telescopically related tube portions of the leg, so that the clamping arrangement which is disposed at the lower end of the inner tube portion can be brought into operative contact with the inside wall surface of the outer tube portion, thereby to secure the two tube portions relative to each other.

Therefore, by virtue of the configuration of the support stand according to the invention, it is advantageously possible to actuate the actuating member which is provided on each leg of the support stand, without the user having to take his eyes away from the item of equipment mounted on the stand and also without having to bend to a considerably lower level. Another advantage of the support stand according to the invention is that the actuating member is sufficiently far at all times from the surface or the ground on which the stand is set up, to ensure that the actuating member does not suffer from fouling.

In accordance with a preferred feature of the present invention, the actuating member of the fixing device of the stand according to the invention is pivotally movable between first, second and third positions, a first position being a locking position in which the fixing device is operative to secure the two tube portions of the respective leg relative to each other, by virtue of a mechanically strong and firm static friction connection therebetween, and the third position being a release position in which the connection between the inner and outer tube portions is totally freed so that the outer tube portion can move freely in the longitudinal direction with respect to the inner tube portion. The second position constitutes a position that is referred to herein as the normal operating position in which the clamping arrangement provides for a sliding frictional connection as between the inner and outer tube portions, so that the one tube portion cannot move freely relative to the other but requires a certain amount of force to produce such movement. Thus, when the actuating member is in the above-mentioned second or normal operating position, the arrangement according to the invention affords the particular advantage that the respective leg can be adjusted by hand wtih a very high degree of accuracy, the force applied by the use of the hand being sufficient to overcome the frictional lock which is formed between the clamping arrangement within the leg, and the inside wall surface of the outer one of the two telescopically related tube portions, against which the above-mentioned pressure element bears. Therefore, with the fixing device in that normal operating position, there is no possibility of the length of the leg being unintentionally varied by virtue of the outer tube portion being capable of moving excessively easily so as to lose the adjusted length, for example as a result of the force of gravity acting thereon when the support stand is lifted clear of the ground.

On the other hand, in order to change the length of a support leg, by virtue of easy movement of the outer tube portion relative to the inner tube portion, as a result of the force of gravity acting thereon, it is only necessary to move the actuating member from the normal operating position into the release position of the fixing device. Those two positions of the actuating member preferably occur within a relatively small amount of angular movement so that the actuating member is very easy to operate. A similar consideration also applies in regard to the locking position of the actuating member, insofar as the angular distance between the locking position of the actuating member and the normal operating position of the actuating member is only small, although in the opposite direction from the release position, relative to the normal operating position. It will be seen therefore that the normal operating position of the actuating member is between the fully locked position and the fully released position thereof. It will be readily appreciated therefore that the above-defined construction and mode of operation of the actuating lever and the clamping arrangement operatively connected thereto affords excellent manipulability of the stand according to the invention.

In a preferred feature of the invention, the actuating member may be mounted pivotably about a pin which extends transversely through two mutually aligned openings in the inner one of the two telescopically related tube portions and which is connected to the connecting rod, while the actuating member may comprise two guide means in the form of slide tracks which are guided on projections secured to the inner tube portion and projecting away therefrom in mutually opposite directions, the slide tracks being guided in that way and being of such a configuration that, when the actuating member is pivoted from the above-mentioned normal operating position in one direction, the distance between the pin and the projections is reduced while when the actuating member is pivoted in the opposite direction, that distance is increased. By virtue of the configuration of the support stand according to the invention, with projections on the inner tube portion, for guiding thereon correspondingly shaped sliding tracks on the actuating member, and by virtue of the pin which extends through the actuating member and which is connected to the connecting rod which in turn co-operates with the clamping arrangement disposed in the interior of the respective leg of the support stand, with the arrangement being such that when the actuating member is pivoted from the normal operating position in one direction the above-mentioned distance between the pin and the projections on the inner tube portion become smaller, the result is that the connecting rod which is operatively connected to the pin is removed downwardly in relation to the associated leg of the stand so that the clamping arrangement which comprises at least one cone or taper member and at least one pressure element co-operating therewith and disposed therearound is moved into a release position under the force of a spring element in the clamping arrangement, more specifically by the cone or tapering member being moved downwardly and out of engagement with the pressure element disposed therearound, by virtue of the downward movement of the connecting rod. Thus, when the clamping arrangement is in that released position, the two tube portions of a respective leg may be easily adjusted in respect of length, for example by allowing the lower part of the leg, which is formed by the outer tube portion, to slip easily downwardly on the inner tube portion which forms the upper part of the leg.

On the other hand, when the actuating member is pivoted from the normal operating position in the opposite direction, the above-mentioned distance between the pin and the lugs on the inner tube portion is increased by virtue of the specific configuration of the slide tracks so that the connecting rod which is operatively connected to the pin moves upwardly in a direction away from the lower part of the leg formed by the outer tube portion. In the upwardly moved position of the connecting rod, the at least one pressure element of the clamping arrangement is urged radially outwardly into the griping frictional contact with the inside wall surface of the outer tube portion of the telescopic leg, by virtue of the tapering or conical configuration of the clamping cone member co-operating therewith. In other words, the cone member engages to an increasing degree into a suitable opening for receiving same in the pressure element, thereby expanding the pressure element radially outwardly to grip against the wall of the outer tube portion. The pressure of the pressure element against the outer tube portion is of such a magnitude that it produces a gripping frictional engagement as between the inner and outer tube portions, such that the two tube portions can no longer be displaced relative to each other by hand. In that condition therefore, the two tube portions of the respective leg are locked relative to each other. However, by pivoting the actuating member upwardly, which is a simple operation to perform, it is easily possible for the actuating member to be moved from the locking position into the release position in which the two tube portions of the leg are very easily movable relative to each other or into the normal operating position in which the two tube portions of the leg are not easily slidable relative to each other but can be moved by hand.

In an advantageous embodiment of the invention, the actuating member may comprise two side plate members which embrace the inner tube portion, with the above-mentioned mounting pin being mounted in the two side plate members of the actuating member. The mutually aligned openings in the inner tube portion, for receiving the mounting pin, are in the form of slots while the two slide tracks are provided in the inwardly or mutually facing surfaces, which are therefore towards the inner tube portion disposed therebetween, of the two side plate members of the actuating member. The two slide tracks are of aligned configuration and arrangement, while the two projections carried on oppositely disposed sides of the inner tube portion are aligned with each other.

Such a construction of the actuating member, with its two side plate members which embrace the inner tube portion provides that all the individual components of the actuating member are protected so as to give a substantially maintenance-free arrangement. Another advantage of this arrangement is that the danger of injury when operating the actuating member is reduced to a minimum. By virtue of the aligned slide tracks and the mutually aligned projections, the actuating member is also easy to operate so that the support stand according to the invention enjoys an excellent service life.

In a preferred feature of the teaching of this invention, the slide tracks may be in the form of grooves which are provided in the inwardly facing surfaces of the two side plate members of the actuating member and which are of a substantially L-shaped configuration, whereby in the normal operating position of the actuating member, the projections are disposed in the region of the intersection between the two limb portions of the L-shape of the respective groove, the two limb portions being disposed at different distances from the mounting pin which is operatively connected to the connecting rod. By virtue of the limb portions of the L-shaped grooves being at different distances from the mounting pin, the spacing between the projections which are stationarily carried on the inner tube portion, and the mounting pin which passes transversely through the inner tube portion, is reduced or increased, depending on the position to which the actuating member is set, in comparison with the normal operating position of the actuating member, whereby the pin is displaced in the elongate openings for receiving it, in the inner tube portion. It will be appreciated that at the same time the connecting rod which is operatively connected to the pin is displaced within the support leg in the longitudinal direction thereof and correspondingly actuates the clamping arrangement which is disposed at the lower end of the connecting rod.

In another advantageous feature of the present invention, the mounting pin for pivotally carrying the actuating member passes through a sleeve which is provided in the interior of the inner tube portion and which has an internal or female screwthread, while the connecting rod, at its end which is towards the head portion of the support stand, has a portion with an external or male screwthread which screws into the screwthread in the sleeve. The sleeve which is prevented from rotating relative to the inner tube portion, by means of the mounting pin, thus serves as an axially displaceable support abutment for the connecting rod. By rotating the connecting rod relative to the sleeve in one direction of rotation or the other, it is easily possible to preset or adjust the mechanical prestressing of the clamping arrangement at the lower end of the connecting rod. In that way it is possible to adjust the co-operation between the clamping cone member and the associated pressure element when the actuating member is in the normal operating position, thereby to adjust the sliding frictional contact between the pressure element and the adjacent inside wall surface of the inner tube portion. That will therefore have the effect of suitably adjusting the manual force required to displace the inner and outer tube portions relative to each other, when the actuating member is in its normal operating position.

Further objects, features and advantages of the construction in accordance with the principles of the present invention will be apparent from the following description of a preferred embodiment which is given by way of example.

BRIEF DESCRIPTION OF THE DRAWINGS

FIG. 1 is a side view on a reduced scale of a support stand having three support legs which extend downwardly from a mounting head portion, FIG. 2 is a view in longitudinal section through a part of one leg of the FIG. 1 support stand, on a larger scale, and showing the actuating member in its first position;

FIG. 3a is a view similar to FIG. 2a, but on a larger scale; and

DESCRIPTION OF THE PREFERRED EMBODIMENT

Figure 2A:
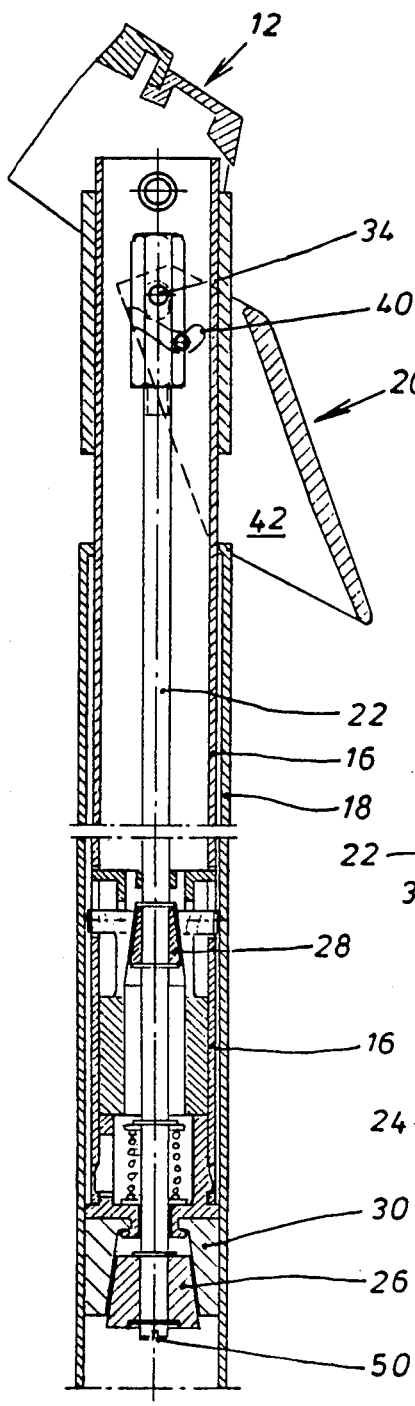
FIG. 2a is a view similar to FIG. 2 showing the actuating member in its second position.

Referring firstly to FIG. 1, shown therein in diagrammatic form is a support stand 10 for supporting an item of equipment such as a photographic, film or video camera or other item of optical equipment which may be for example a telescope or the like. The support stand 10 has a support head portion 12 for mounting the item of equipment thereon and, as illustrated, three support legs 14 which extend away downwardly from the head portion 12. Each of the support legs 14 comprises first and second tube portions 16 and 18 which are connected together in telescopic relationship in such a way that one tube portion, being referred to herein as the inner tube portion 16, can be displaced into and out of the other or outer tube portion 18. As will be appreciated, the external cross-section of the inner tube portion 16 is adapted in respect of shape to the internal cross-section of the outer tube portion 18.

The inner and outer tube portions 16 and 18 of each leg can also be locked relative to each other, thereby to fix the stand 10 to provide support for its item of equipment, at a suitable, selected height.

In the support stand 10 in accordance with this invention, as clearly illustrated in FIG. 1, the inner tube portions 16 of the respective legs are connected at their upper ends to the head portion 12 while the outer tube portion 18 of each leg is carried on the inner tube portion 16, at the end thereof which is the lower end in the normal position of the stand 10, as shown in FIG. 1. Thus, the inner tube portion 16 forms the upper part of each leg and the outer tube portion 18 forms the lower part.

Figure 2B:
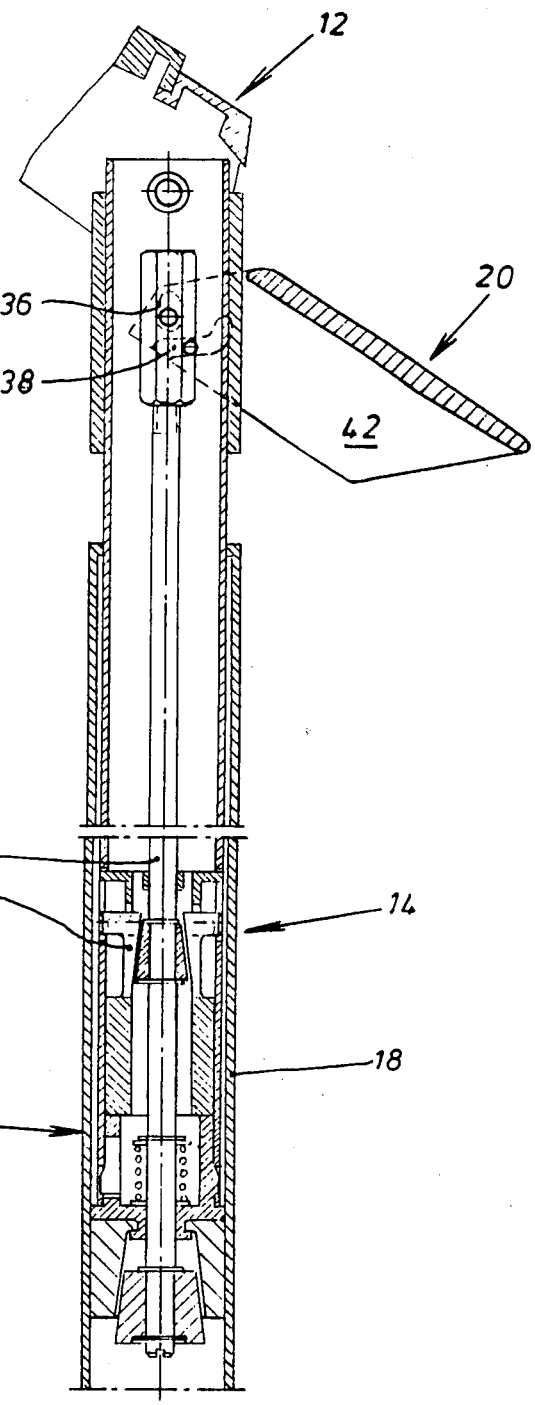
FIG. 2b is a view similar to FIG. 2, but showing the actuating member in its third position.

Referring now to FIG. 2, shown therein is the upper part of one of the support legs 14 of the stand 10 illustrated in FIG. 1. The fixing device for the illustrated leg comprises an actuating member 20 which is mounted pivotably on the leg 14 in a manner to be described hereinafter, a connecting rod 22 which extends within the leg and which is operatively connected to the actuating member 20, and a clamping arrangement indicated generally at 24. In the illustrated embodiment, the clamping arrangement 24 comprises two clamping cone or taper members 26 and 28 which are disposed at an axial spacing from each other on the connecting rod 22, and two pressure elements 30 and 32 which are similarly disposed at an axial spacing from each other within the leg 14 and which respectively co-operate with the cone members 26 and 28. The actuating member 20 is carried on the inner tube portion 16 in the vicinity of the support head portion 12 of which only a part is shown in FIG. 2.

The actuating member 20 is pivotable between first, second and third positions, the first position corresponding to a locking position in which the inner and outer tube portions 16 and 18 of a respective leg 14 are prevented from axial movement relative to each other, while the third position is an unlocked or released position in which the two tube portions 16 and 18 can move easily relative to each other for example of their own accord as a result of the force of gravity acting thereon. The second position is what is referred to herein as the normal operating position, in which condition the actuating member 20 is neither in the locked position nor in the unlocked position but is in a position in which there is a frictional connection which can be overcome by hand, between the two tube portions 16 and 18 of the associated leg, thereby to permit the length of the leg to be accurately adjusted. In FIG. 2, the actuating member 20 is shown in the locking position. In the normal operating position of the actuating member 20, the clamping arrangement 24 provides a sliding frictional connection between the inner tube portion 16 and the outer tube portion 18, such that, as mentioned above, the two tube portions 16 and 18 can be displaced relative to each other in the longitudinal direction of the leg 14. In that way the overall length of the leg 14 can be adjusted with a very high degree of accuracy and in a controlled fashion. Further details of the mode of operation of the clamping arrangement 24 will be set out below.

Thus, in the locking position of the actuating member 20 as shown in FIG. 2, the clamping arrangement 24 produces a mechanically fixed gripping frictional connection between the inner tube portion 16 and the outer tube portion 18, in such a way that the two tube portions 16 and 18 cannot be displaced relative to each other by hand. Thus, when the actuating member 20 is in the locked position, the overall length of a leg 14 is invariable.

In the release position of the actuating member 20, which can be very easily attained by simply pivoting the actuating member, the fixed connection between the inner tube portion 16 and the outer tube portion 18 is released so that the outer tube portion 18 can be moved easily, for example by virtue of the force of gravity acting thereon, in relation to the inner tube portion 16.

Figure 3:
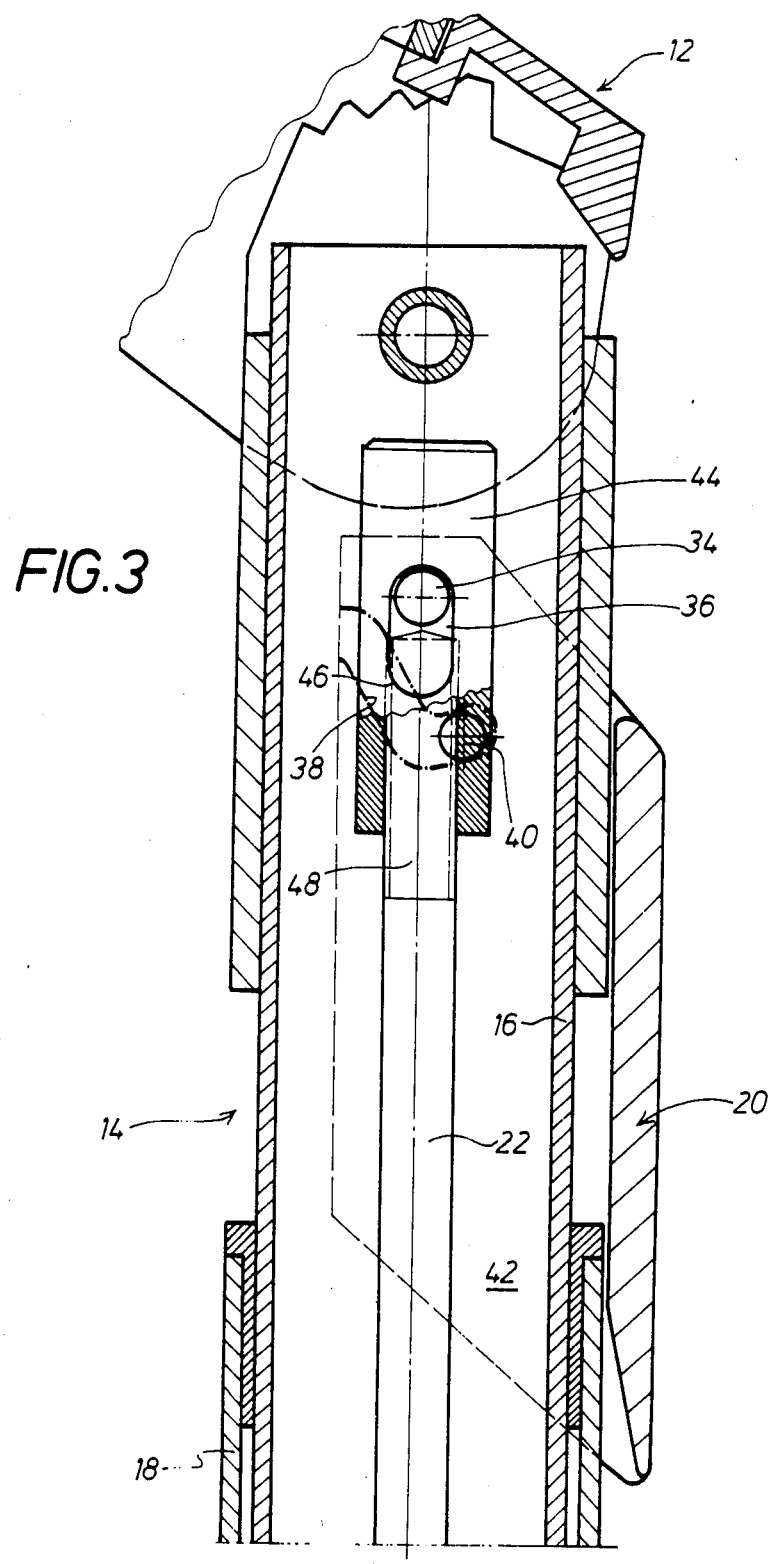
FIG. 3 is a view in longitudinal section through the upper end portion of a support leg as shown in FIG. 2, on an even larger scale.
Figure 3B:
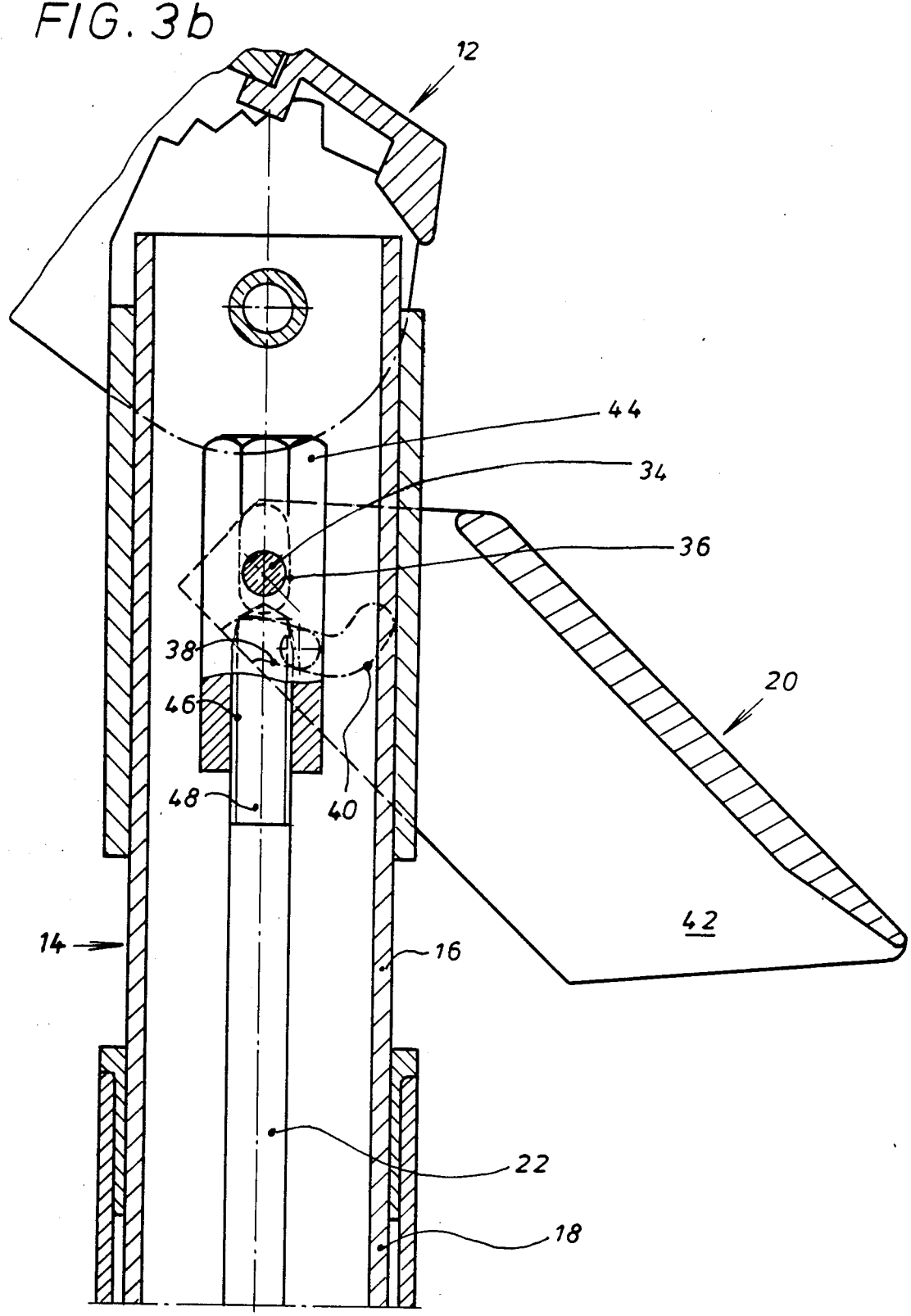
FIG. 3b is a view similar to FIG. 2b, but on a larger scale.

Referring now also to FIG. 3, the actuating member 20 is mounted on the inner tube portion 16 pivotably about a mounting pin 34 which extends through two mutually aligned openings 36 in the inner tube portion 16 and which is operatively connected to the connecting rod 22 within the leg 14. As indicated by dashdotted lines in FIGS. 2 and 3, the actuating member 20 has two guide means as shown at 38. Further reference to the two guide means 38 will be set out below. The guide means 38 are guided on lugs or projections such as pins 40, which are secured to the outside surface of the inner tube portion 16 and which project away from the latter in mutually opposite directions.

When the actuating member 20 is pivoted from the normal operating position in one direction, the distance between the mounting pin 34 and the projections 40 is reduced. That causes the connecting rod 22 to be moved downwardly, by virtue of the connecting rod 22 being operatively connected to the pin. Because the connecting rod 22 thus moves downwardly, the wedge effect which is provided by the co-operation between the cone members 26 and 28 and the pressure elements 30 and 32 respectively disposed therearound is eliminated whereby the pressure elements 30 and 32 are no longer pressed against the inside wall surface of the outer tube portion 18.

When on the other hand the actuating member 20 is pivoted from the normal operating position in the opposite direction to the direction referred to above, that is to say, towards the locking position of the actuating member 20, the distance between the mounting pin 34 and the projections 40 is increased. That causes the connecting rod 22 to be moved upwardly towards the head portion 12 so that the cone members 26 and 28 urge the pressure elements 30 and 32 radially outwardly and into strong and firm contact with the inside wall surface of the outer tube portion 18. Accordingly, the pivotal movement of the actuating member 20 into the locking position gives a mechanically fixed lock as between the inner tube portion 16 and the outer tube portion 18, by virtue of the clamping arrangement 24 being carried by the inner tube portion 16 and being operable to bear against the inside wall surface of the outer tube portion 18.

Referring still to FIGS. 2 and 3, the actuating member 20 has two side plate members or portions 42 which embrace the inner tube portion 16, thus extending on respective sides thereof. The mounting pin 34 is mounted in the two side plate members 42 of the actuating member 20, and the two mutually aligned openings 36 in the inner tube portion 16 are in the form of slots which are elongate at least substantially in the axial direction of the tube portion 16. Thus, when the actuating member 20 is pivoted, the projections 40 are displaced in the guide means 38 with which they respectively co-operate and the pin 34 can perform a limited movement in the axial or longitudinal direction of the leg 14, and thus in the direction of the connecting rod 22. The two guide means 38 are in the form of slide tracks, such as grooves, in the respective inside surfaces, which face towards the inner tube portion 16, of the two side plate members 42. The two slide tracks 38 are of an aligned configuration and arrangement and the two projections 40 secured to the inner tube portion 16 are aligned with each other. The aligned configuration and arrangement of the two slide tracks 38 and the mutually aligned projections 40 ensure that the actuating member 20 is very good and convenient to operate. As indicated above, the slide tracks 38 are in the form of grooves or channels which are provided in the inwardly facing surfaces of the respective side plate members 42 and are of an L-shaped configuration such that, in the normal operating position of the actuating member, as defined above, the projections 40 are disposed in the region of the intersection of the two limb portions of the respective L-shaped groove. The two limb portions of each L-shaped groove constituting the aligned slide tracks 38 are disposed at different distances from the mounting pin 34 which is connected to the connecting rod 22, as can be clearly seen from FIGS. 2 and 3.

Referring now more particularly to FIG. 3; it will be seen therefrom that the mounting pin 34 about which the actuating member pivots passes through sleeve 44 which is thus disposed in the interior of the inner tube portion 16. The sleeve 44 has an internal or female screwhead as indicated at 46. At its end which is towards the head portion 12 of the support stand, the connecting rod 22 comprises a portion with an external or male screwthread as indicated diagrammatically at 48, which is screwed into the screwhead in the sleeve 44, thereby connecting the connecting rod 22 to the sleeve 44. The sleeve 44 is prevented from rotating with respect to the inner tube portion 16, by means of the pin 34. Rotating the connecting rod 22 in one direction of rotation or the other makes it possible to adjust the prestressing force which provides for the clamping arrangement 24 to take up the normal operating condition in which it provides resistance to relative movement of the tube portions 16 and 18 with respect to each other, which however can be overcome by manual force, as well as permitting adjustment of the locking force with which the cone members 26 and 28 are caused to urge the pressure elements 30 and 32 radially outwardly to lock against the outer tube portion 18, thereby firmly to secure the two tube portions 16 and 18 relative to each other. The connecting rod 22 can be rotated for adjustment pupooses by a screwdriver slot 50 at the lower end of the connecting rod 22.

It will be appreciated that the foregoing construction was described solely by way of example of the principles of the present invention and that modifications and alterations may be made therein without thereby departing from the spirit and scope of the present invention.

We claim:

1. A stand for an item of equipment, comprising a head portion, a plurality of support legs connected to the head portion, each of said support legs comprising inner and outer tubular portions displaceable in telescopic relationship with each other, said inner tube portion connected to said head portion and said outer portion connected to the inner tube portion;

and a fixing means for fixing the tube portions of each support leg relative to each other, comprising an actuating member on the inner tube portion, a connecting member operatively connected to the actuating member and a clamping arrangement operable by said connecting member and which includes at least one clamping cone member on the connecting member and on the inner tube portion at least one pressure element co-operable with the cone member;

said actuating member being pivotably movable between locking, normal operating and release positions wherein the clamping arrangement in said locking position of said actuating member provides a fixed frictional connection between the inner and outer tube portions and in said release position releases said connection between the inner and outer tube portions whereby said outer tube portion is freely slidable relative to the inner tube portion, while the clamping arrangement in said normal operating position of the actuating member provides for a sliding frictional relationship between the first and second tube portions.

2. A stand as set forth in claim 1 wherein said inner tube portion has two mutually aligned openings therein, wherein said actuating member is mounted on said inner tube portion pivotably about a pin which extends transversely through said mutually aligned openings in said inner tube portion and which is operatively connected to said connecting rod, and wherein said actuating member has guide means adapted slidably to receive projections on said inner tube portion whereby upon pivotal movement of said actuating member from said normal operating position in one direction the distance between said pin and said projections is reduced and upon pivotal movement of said actuating member in the opposite direction said distance is increased.

3. A stand as set forth in claim 2 wherein said actuating member comprises first and second spaced side portions embracing said inner tube portion, said pin is mounted in said side portions of the actuating member, said two mutually aligned openings in said inner tube portion are formed as slots, said guide means comprise first and second slide tracks provided in the respective inside surfaces, which are towards said inner tube portion, of said two side portions of said actuating member, said slide tracks are of aligned configuration and arrangement, and said projections are disposed on said inner tube portion on oppositely disposed sides thereof and in alignment with each other.

4. A stand as set forth in claim 3 wherein said guide means are in the form of grooves in said inside surfaces of said side portions and of an L-shaped configuration such that in said normal operating position of said actuating member said projections are disposed in the respective regions of intersection between the two limb portions of the L-shaped grooves, and said limb portions of each L-shaped groove are at different distances from said pin.

5. A stand as set forth in claim 2 and further including a sleeve in the interior of said inner tube portion having a female screwthread, wherein said pin extends through said sleeve and wherein said connecting member, at its end towards said head portion, has a portion having a male screwthread thereon said male screwthread engageable with said female screwthread in said sleeve.

* * * * *